May 13, 1969  J. C. ELLIOTT ET AL  3,443,689
AERODYNAMIC SEPARATION OF SMOOTH, ROUND
FROM ROUGH, IRREGULAR OBJECTS
Filed May 29, 1968  Sheet 1 of 4
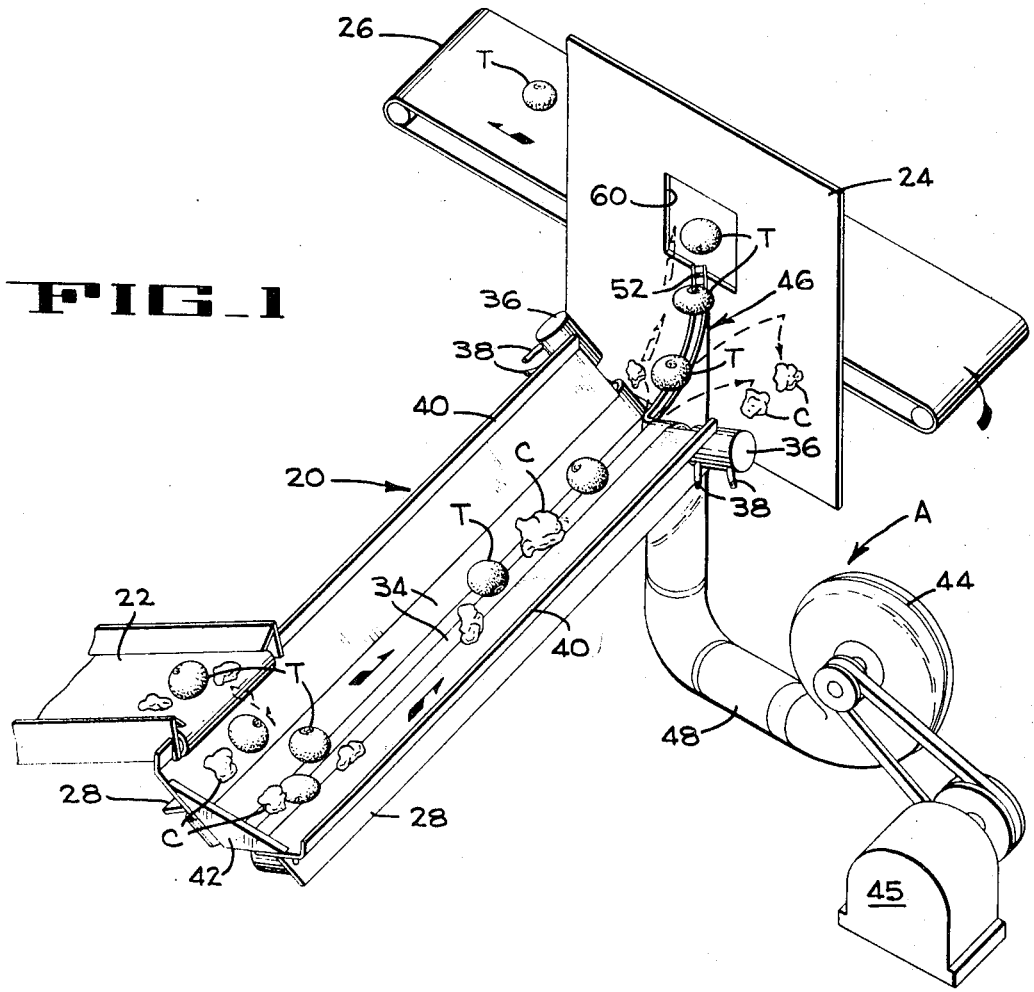
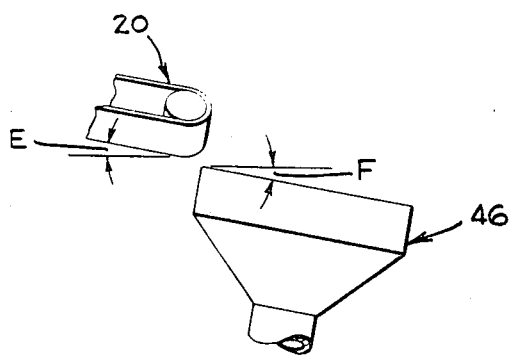
INVENTORS.
JAMES C. ELLIOTT
JOHN BOYCE
BY F. W. Anderson
C. E. Tripp
ATTORNEYS

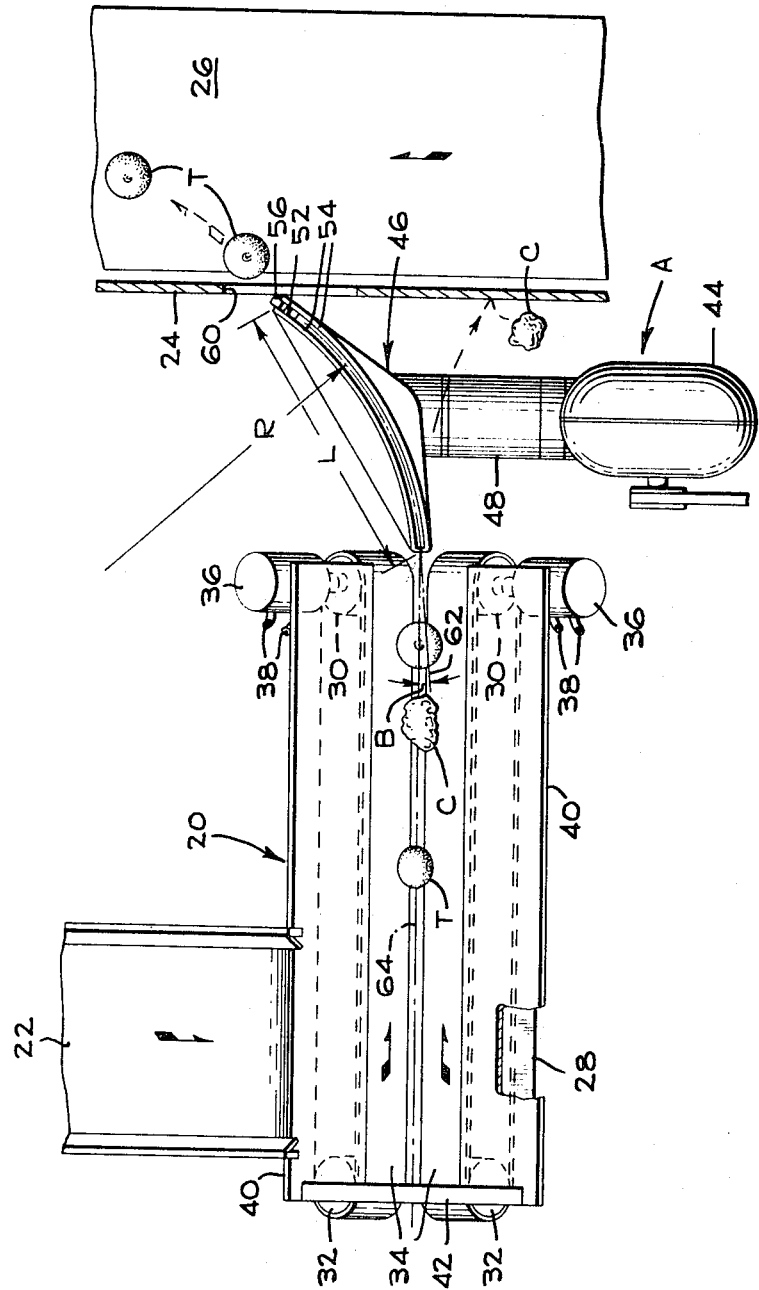

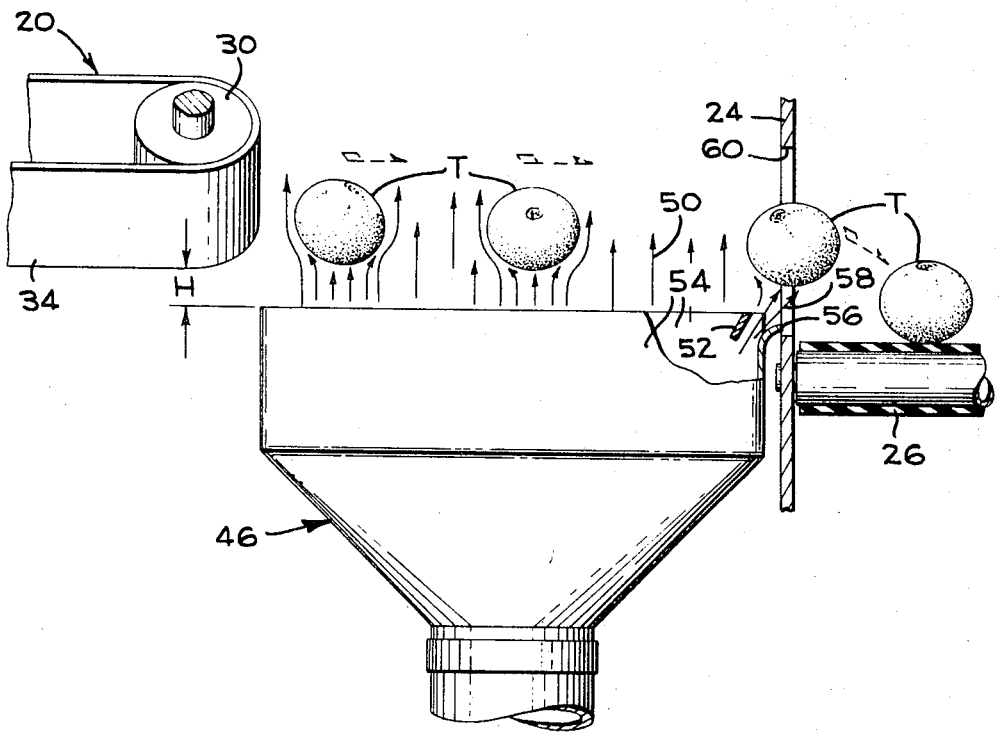
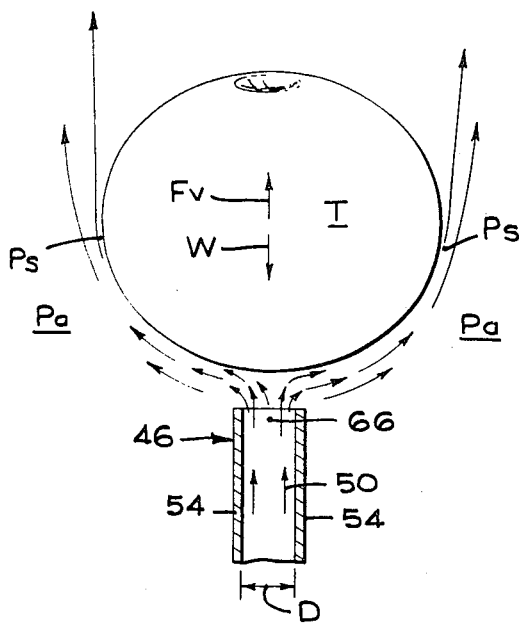

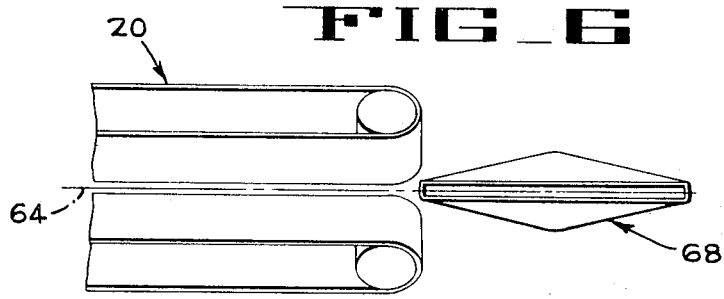
FIG_6
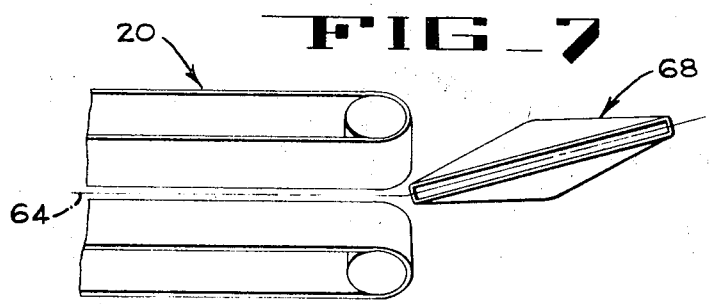
FIG_7
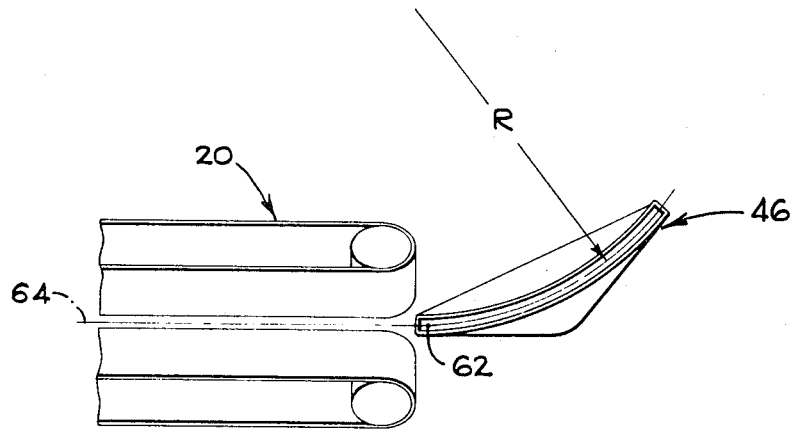
FIG_8
INVENTORS.
JAMES C. ELLIOTT
JOHN BOYCE
BY F. W. Anderson
C. E. Tripp
ATTORNEYS

United States Patent Office 3,443,689
Patented May 13, 1969

3,443,689
AERODYNAMIC SEPARATION OF SMOOTH, ROUND FROM ROUGH, IRREGULAR OBJECTS
James Carl Elliott, Palo Alto, and John Boyce, San Jose, Calif., assignors to FMC Corporation, San Jose, Calif., a corporation of Delaware
Filed May 29, 1968, Ser. No. 732,933
Int. Cl. B07b 4/00
U.S. Cl. 209—139                                   15 Claims

ABSTRACT OF THE DISCLOSURE

Tomatoes are separated from clods of dirt by directing them, in single file, into and along a vertical sheet of air formed by a long and narrow nozzle. The tomatoes, due to their round, smooth shape, are lifted and centered in the air stream and move along the center line of the nozzle as the result of their initial momentum and, if desired, additional forward momentum obtained by declining the forward end of the nozzle slightly below the horizontal. As the tomatoes reach the end of the nozzle, they exit from the airstream due to their momentum and a forwardly inclined stream of air induced by a deflector and are deposited on a discharge conveyor. The clods of dirt are ejected obliquely from the airstream as the result of unbalanced forces due to their irregular shape.

BACKGROUND OF THE INVENTION

*Field of the invention*

The present invention provides a method for separating round smooth-shaped objects from irregularly shaped objects, such as fruit and clods of dirt or the like gathered up during harvesting. Separation is by means of a vertical current, gaseous suspension. The separating method and apparatus will be described as applied to separating tomatoes from clods of dirt.

*Description of the prior art*

An apparatus for cleaning and separating materials is disclosed by Taggart, Patent No. 1,837,299. The invention describes an apparatus for separating materials by their difference in weight. The mixture is advanced longitudinally over a chamber by a pair of inclined, parallel rolls rotating in opposite directions. The rolls are spaced apart and a vertical stream of air is directed upwardly between the rolls from a nozzle located in a chamber below. The mixture is agitated and advanced by the action of the rolls while, the vertical stream exerts sufficient pressure between the rolls preventing the lighter material from falling and permitting the heavier material to fall through the stream into the chamber below; the lighter material being discharged off the end of the rolls.

A vertical air current potato separating machine is disclosed by La Pointe, Patent No. 2,448,446, in which a mixture of potatoes and dirt is fed obliquely downward by a chute into a vertical rectangular conduit. A fan at the base of the conduit produces an upward vertical flow of air which is constricted by an adjustable baffle extending from the feed chute into the conduit. The mixture slides down the feed chute, across the baffle into the airstream where the potatoes are floated across the airstream exiting through a discharge chute. The rocks and heavy articles fall downward through the airstream onto a sloped screen located above the fan and slide out through an opening in the conduit and lighter material is blown out of the top of the conduit.

SUMMARY OF THE INVENTION

Through the employment of the present invention, the need for an operator to separate the tomatoes from a mixture of tomatoes and clods of dirt gathered during harvesting is eliminated. During the separating operation the tomatoes are gently handled reducing the number rejected due to cuts and bruises. The separating apparatus is constructed such that it is not subject to obstruction or clogging and has the additional advantage of delivering the separated tomatoes in single file which may be particularly advantgeous for further processing. Another advantage of the present invention is the ability to separate objects of identical or similar densities.

The advantages described are obtained by causing a conveyor to introduce the mixture into an upwardly moving sheet of air. A specially constructed vertical nozzle and blower assembly produces the upwardly moving sheet of air, which is generally in the plane of the conveyor motion. The conveyor introduces the mixture of tomatoes and clods of dirt in a single file and directs it into the near edge of the sheet of air produced by the nozzle and blower assembly. The tomatoes are vertically lifted and supported in the air stream by a pressure differential between the top and bottom surfaces equal to their weight and are retained laterally due to balanced forces as a result of their smooth, rounded, symmetrical shape. The tomatoes thus retained in the air stream, move along the sheet of air due to their momentum; exiting the airstream only upon reaching the end of the nozzle. The clods of dirt are ejected obliquely to either side of the airstream before reaching its end due to unbalanced forces created on their irregular unsymmetrical surfaces.

By curving or inclining the nozzle slightly away from the initial direction given the mixture by the lead-in conveyor, clods initially supported by the airstream are not able to follow the airstream, thereby increasing the efficiency of clod rejection.

In the aforementioned Taggart apparatus, the separation is accomplished by supporting and transporting the mixture by means of rolls and preventing the lighter objects from falling between the rolls by means of a vertical airstream. The La Pointe machine accomplishes separation by passing the mixture across a vertical airstream; the heavier objects falling down through the airstream.

BRIEF DESCRIPTION OF THE DRAWINGS

FIGURE 1 is a diagrammatic perspective showing the apparatus of the present invention;

FIGURE 2 is a plan view of the apparatus;

FIGURE 3 is a fragmentary enlarged side view with portions broken away for clarity;

FIGURE 4 is a fragmentary enlarged section taken across the nozzle throat;

FIGURE 5 is a fragmentary diagrammatic side view of the conveyor and nozzle showing a modified orientation.

FIGURE 6 is a fragmentary diagrammatic plan view of the conveyor and a modified form of the nozzle;

FIGURE 7 is a view like FIGURE 6 of another modified form;

FIGURE 8 is a view like FIGURE 6 of yet another modified form.

THE SEPARATION SYSTEM

Referring to FIGURE 1, the separation system includes a lead in conveyor 20 which receives tomatoes T and clods of dirt C from a supply conveyor 22 or other source, an air blower and nozzle assembly A, a baffle 24 and a discharge conveyor 26 or receptacle for receiving the separated tomatoes.

As shown in FIGURES 1 and 2 the lead in conveyor 20 is comprised of support frames 28 in which drive rollers 30 and idler rollers 32 are mounted. Endless belts 34 are trained about the rollers 30 and 32 and form an open bottomed V. At the discharge end of the conveyor, hydraulic motors 36 are mounted to the support frames 28 and are connected to the drive rollers 30. The speed of the hydraulic motors 36 is individually controlled through lines 38 by flow valves (not shown). Side guard plates 40 attached to support frames 28, overlap the tops of the belts 34 and extend upwardly to confine the mixture of tomatoes and clods on the conveyor. An end plate 42 is mounted between the guards 40 and prevents spilling of the mixture off the rear end of the lead in conveyor 20.

The hydraulic motors 36 are driven at different speeds resulting in a differential speed between the belts 34 which in conjunction with the V orientation of the belts causes the mixture to form a single file. The lead in conveyor 20 is inclined slightly downward, which in conjunction with the forward motion of the conveyor imparts forward momentum to the mixture to be separated.

The blower 44 is a conventional centrifugal blower which is driven by a motor 45 and delivers a continuous flow of air to the nozzle 46 through duct 48. The nozzle 46 forms a throat with a long, narrow orifice which forces the air into a smooth, narrow upwardly directed stream or sheet of air 50 (FIGURE 3). The rearward end of the nozzle 46 is located at the end of, slightly below, and substantially centered between the lead in conveyor belts 34. The forward end of the nozzle 46 contains a deflector plate 52, mounted between the nozzle sides 54, which in conjunction with a lip 56, form a forwardly inclined, booster stream of air 58 at the front of the nozzle as shown in FIGURE 3.

In order to prevent clods of dirt C from being flung onto the discharge conveyor 26, the baffle 24 with a window 60, sufficiently large to allow uninterrupted passage of the tomatoes T, is located between the nozzle 46 and the discharge conveyor 26.

OPERATION

The mixture of tomatoes T and clods C is directed into the vertical stream of air 50 from the lead in conveyor 20, as previously described.

As shown in FIGURE 4 the vertical flow of air 50 impinges on the bottom of the tomato T and urges it upwardly. The tomato T will be lifted to a sufficient height until the net vertical force $F_v$ of the air impinging on the tomato T equals the weight W of the tomato T. As the air flows around the sides of the tomato its velocity increases and then decreases as the stream dissipates above the tomato. From Bernoulli's law, it is known that pressure varies inversely with the velocity. Applying this fact to the tomato T in the airstream, the tomato T is laterally retained in the airstream due to its smooth, rounded, symmetrical shape and the fact that the atmospheric pressure $P_a$ outside the airstream is greater, having zero velocity, than the pressure $P_s$ on the sides of the tomato, where the air velocity is highest. Therefore if the tomato T is directed slightly off-center to the airstream, but not far enough so that it will not be supported, the resultant difference in air velocities between the two sides and the resultant pressure differential will cause the tomato T to move back into the center of the airstream. The initial momentum imparted to the tomato T causes it to move along the nozzle and through the stream; all other forces being balanced.

The clods of dirt C are ejected obliquely from the airstream as the result of unbalanced forces created by their rough, irregular surfaces and lack of symmetry, as well as the inability of the airstream to provide prolonged support for objects of significantly greater density than tomatoes.

Occasionally, a clod of dirt C is sufficiently balanced so that it is retained in the stream of air 50 for a period of time. By curving the nozzle with a radius R (FIGURE 2) and by orienting the nozzle 46 such that the tangent 62 to radius R forms an angle B to the axis 64 of the conveyor 20 as shown in FIGURE 2, the efficiency of dirt rejection is increased. The clod C is unable to develop a balanced low pressure area, such as $P_s$ for the tomato, due to the turbulent airflow caused by its rough irregular surfaces. Thus contrary to the action of the tomatoes, no lateral retaining forces are developed about the clods, and they do not follow the airstream as it diverges from the initial direction imparted by the lead in conveyor 20.

As the tomato reaches the end of the nozzle its momentum must overcome the restraining effects of the airstream on its leading face, in order to pass through the window 60 in the baffle 24 and onto the discharge conveyor 26. Occasionally, the momentum of the tomato T is not sufficient; therefore, the aforementioned deflector plate 52 and lip 56 are added to form a forwardly inclined stream of air 58 which boosts the tomato T off the end of the nozzle 46.

TYPICAL DESIGN

The following data represent some of the major parameters of a typical design. The speed of the lead in conveyor 20 is in the order of 300 feet per per minute with a differential speed of approximately 15 percent between the belts 34. The length of the lead in conveyor is variable and depends on the length required to singulate the input volume, and the length required for the mixture of tomatoes and clods to substantially attain the velocity of the conveyor 20. The height H of the lead in conveyor belts 34 above the nozzle 46 is about one inch, as shown in FIGURE 3. The width of the nozzle opening D (FIGURE 4) is ¾ of an inch and the nozzle has a length L of approximately 16 inches with a radius of curvature R (FIGURE 2) in the order of 16 to 19 inches. An angle B of 9 degrees between tangent 62 and conveyor axis 64 (FIGURE 2) provides improved dirt ejection without materially increasing the rejection of tomatoes. Power is supplied to the blower 44 to provide an airstream with sufficient velocity to produce the desired results. A pitot tube inserted in the nozzle opening at approximately point 66 (FIGURE 4) should indicate a velocity head in the order of 6 to 12 inches of water. A window 60 of 6 x 6 inches provides sufficient clearance for the tomatoes while the size of the baffle 24 is primarily dependent on the size and type of discharge conveyor 26 to be shielded.

MODIFICATIONS

In the embodiment shown, the lead in conveyor 20 and nozzle 46 are substantially horizontal however, by inclining them downward in the forward direction as shown by angles E and F respectively in FIGURE 5, the length and/or speed of the lead in conveyor 20 may be reduced while retaining the desired initial momentum of the mixture.

Various other nozzle arrangements also provide satisfactory separation such as, a straight nozzle 68 in line with the axis 64 of the conveyor 20 (FIGURE 6), a straight nozzle 68 inclined in a horizontal plane to the axis of the conveyor (FIGURE 7), a curved nozzle 46 whose tangent 62 to radius R coincides with the axis 64 of the conveyor 20 (FIGURE 8).

In the embodiment described herein for separating tomatoes and clods of dirt the method of separation does not depend on the difference in density of the objects to be separated. The method and apparatus may equally as well be applied to the separation of other smooth, rounded objects from rough, irregular objects even though both types of objects have identical or similar densities.

Although the best mode for carrying out the invention has been shown and described herein, it will be apparent that modification and variation may be made without departing from what is regarded to be the subject matter of the invention as set forth in the appended claims.

Having completed a detailed description of the invention so that those skilled in the art could practice the same we claim:

1. A method of separating smooth, rounded objects from a mixture of the smooth, rounded objects and rough, irregular objects comprising the steps of; directing a continuous, long, narrow stream of air upwardly into the atmosphere; introducing said mixture with a horizontal momentum into one end of said airstream and the surrounding atmosphere whereby said airstream lifts and supports said smooth rounded objects while retaining them in the stream as they move therethrough until the smooth, rounded objects reach the other end of the stream of air, the rough irregular objects being also supported by the stream of air initially, but due to their lack of symmetry being ejected obliquely to either side of the long axis of the stream before reaching its end.

2. The method of claim 1, wherein the stream of air and hence the smooth, rounded objects are caused to diverge from the initial direction of the mixture.

3. The method of claim 1, wherein said objects to be separated are of the same density.

4. The method of claim 1, comprising boosting the smooth, rounded objects off the end of the said stream of air with a booster air stream.

5. Apparatus for separating smooth, rounded objects from a mixture of the smooth, rounded objects and rough, irregular objects comprising; a conveyor for moving the mixture of objects preferably in a single file path, said conveyor imparting momentum and direction to the mixture; a blower for supplying a continuous flow of air; nozzle means connected to the said blower located at the discharge of said conveyor, said nozzle means defining a long, narrow discharge orifice opening into the atmosphere for directing the flow into the surrounding atmosphere as a long, narrow, vertical sheet of air at a sufficient velocity to vertically lift, support and laterally retain the smooth round objects in the stream of air above said nozzle, said conveyor supplying sufficient initial momentum to the mixture to move the mixture into one end of and through the sheet of air along the narrow horizontal axis of the nozzle, and out of the other end; said sheet of air ejecting the rough, irregular objects obliquely therefrom and to either side of said nozzle.

6. The apparatus of claim 5, wherein the said conveyor is inclined downwardly, enabling the mixture to achieve sufficient momentum in a shorter distance.

7. The apparatus of claim 5, wherein the said nozzle is straight and is inclined in a horizontal plane to the initial direction of the mixture.

8. The apparatus of claim 5, wherein the said nozzle is curved in a horizontal plane and the radius of curvature is tangent to the initial direction of the mixture.

9. The apparatus of claim 5, wherein the said nozzle is curved in a horizontal plane and the radius of curvature intersects the initial direction of the mixture.

10. The apparatus of claim 5, wherein the said nozzle is inclined downwardly, causing gravity to impart additional momentum to the smooth, rounded objects while in the sheet of air.

11. The apparatus of claim 5, wherein said nozzle contains booster means for forwardly directing a portion of the sheet of air at the downstream end of the nozzle for boosting the smooth, rounded objects out of the sheet of air.

12. The apparatus of claim 11, wherein said booster means comprises a forwardly inclined deflector mounted between the nozzle sides and a forwardly inclined lip formed at the forward end of the nozzle.

13. The apparatus of claim 5, including a baffle adjacent the downstream end of said nozzle means and interposed in the trajectory of the rough, irregular objects without interrupting the path of the smooth, rounded objects as they leave the forward end of the nozzle.

14. The apparatus of claim 13, wherein said baffle defines a window for passage of the smooth, rounded objects therethrough.

15. The apparatus of claim 13, wherein a discharge conveyor positioned adjacent said baffle is shielded by said baffle.

References Cited

UNITED STATES PATENTS

| | | | |
|---|---|---|---|
| 393,411 | 11/1888 | Willis | 209—139 |
| 1,837,299 | 12/1931 | Taggart | 209—466 |
| 2,448,446 | 8/1948 | La Pointe | 209—139 |
| 3,311,234 | 3/1967 | Rumpf | 209—137 |

FRANK W. LUTTER, *Primary Examiner.*

U.S. Cl. X.R.

209—147